(12) United States Patent
Yamashiro et al.

(10) Patent No.: US 12,421,152 B2
(45) Date of Patent: Sep. 23, 2025

(54) METHOD FOR PRODUCING GLASS FILM (71) Applicant: Nippon Electric Glass Co., Ltd., Shiga (JP)

(72) Inventors: Riku Yamashiro, Shiga (JP); Hiroki Mori, Shiga (JP)

(73) Assignee: NIPPON ELECTRIC GLASS CO., LTD., Shiga (JP)

( * ) Notice: Subject to any disclaimer, the term of this patent is extended or adjusted under 35 U.S.C. 154(b) by 387 days.

(21) Appl. No.: 17/777,355

(22) PCT Filed: Jan. 8, 2021

(86) PCT No.: PCT/JP2021/000513
§ 371 (c)(1),
(2) Date: May 17, 2022

(87) PCT Pub. No.: WO2021/149519
PCT Pub. Date: Jul. 29, 2021

(65) Prior Publication Data
US 2022/0411308 A1  Dec. 29, 2022

(30) Foreign Application Priority Data
Jan. 20, 2020  (JP) ................................. 2020-006738

(51) Int. Cl.
*C03B 17/06* (2006.01)
*C03B 33/03* (2006.01)

(52) U.S. Cl.
CPC .......... *C03B 17/064* (2013.01); *C03B 17/068* (2013.01); *C03B 33/03* (2013.01)

(58) Field of Classification Search
None
See application file for complete search history.

(56) References Cited

U.S. PATENT DOCUMENTS

| | | | | |
|---|---|---|---|---|
| 4,454,972 A | * | 6/1984 | Maltby, Jr. | C03B 33/0235 225/2 |
| 5,871,134 A | * | 2/1999 | Komagata | C03B 33/033 225/2 |
| 9,399,595 B2 | * | 7/2016 | Furuta | C03B 33/033 |
| 9,840,028 B2 | * | 12/2017 | Matsumoto | C03B 35/189 |
| 9,931,816 B2 | * | 4/2018 | Tomamoto | B65H 18/28 |

(Continued)

FOREIGN PATENT DOCUMENTS

| | | | | |
|---|---|---|---|---|
| CN | 103118998 | | 5/2013 | |
| CN | 109923079 A | * | 6/2019 | ................ B26F 3/00 |

(Continued)

OTHER PUBLICATIONS

International Search Report issued Mar. 23, 2021 in International (PCT) Application No. PCT/JP2021/000513.

(Continued)

*Primary Examiner* — Jodi C Franklin
(74) *Attorney, Agent, or Firm* — Wenderoth, Lind & Ponack, L.L.P.

(57) ABSTRACT

In a method of manufacturing a glass film, in a cutting step, a crack (CR) formed in a non-product portion (Gc1, Gc2) along a longitudinal direction of a glass film (G2) is guided by a guiding member (17a, 17b) so as to propagate to an outer end portion (Gd) of the non-product portion (Gc1, Gc2) in a width direction.

5 Claims, 9 Drawing Sheets

(56) References Cited

U.S. PATENT DOCUMENTS

| | | | |
|---|---|---|---|
| 9,932,259 B2* | 4/2018 | Hasegawa | C03B 23/02 |
| 2010/0162758 A1* | 7/2010 | Lang | C03B 33/0235 |
| | | | 65/29.11 |
| 2012/0125967 A1 | 5/2012 | Furuta et al. | |
| 2013/0129987 A1* | 5/2013 | Mitsugi | C03B 17/06 |
| | | | 428/192 |
| 2015/0321943 A1* | 11/2015 | Chang | C03B 33/033 |
| | | | 83/27 |
| 2016/0039708 A1* | 2/2016 | Ellison | C03C 1/00 |
| | | | 501/66 |
| 2018/0141847 A1* | 5/2018 | Booth | C03B 35/246 |
| 2018/0305246 A1* | 10/2018 | Hung | C03B 25/12 |
| 2019/0177202 A1* | 6/2019 | Mori | C03B 33/105 |
| 2019/0292086 A1 | 9/2019 | Murashige et al. | |
| 2019/0352115 A1* | 11/2019 | Mori | B65H 23/28 |
| 2020/0079679 A1* | 3/2020 | Mori | C03B 35/16 |
| 2020/0164545 A1* | 5/2020 | Mitsugi | B28D 7/046 |
| 2020/0346986 A1* | 11/2020 | Stemwedel | C02F 11/04 |
| 2021/0269347 A1* | 9/2021 | Zimmer | C03B 17/064 |
| 2023/0033067 A1* | 2/2023 | Murashige | B32B 3/16 |

FOREIGN PATENT DOCUMENTS

| | | | | |
|---|---|---|---|---|
| CN | 111278779 B * | 3/2023 | | B65H 35/02 |
| DE | 3927731 A1 * | 2/1991 | | C03B 33/033 |
| DE | 102005048247 A1 * | 4/2006 | | C03B 33/033 |
| EP | 1048621 A2 * | 11/2000 | | C03B 17/06 |
| JP | 3887394 B2 * | 2/2007 | | C03B 33/033 |
| JP | 4621996 B2 * | 2/2011 | | C03B 17/064 |
| JP | 2015-174744 | 10/2015 | | |
| JP | 2016204176 A * | 12/2016 | | |
| JP | 2018-522801 | 8/2018 | | |
| JP | 2019-104660 | 6/2019 | | |
| WO | WO-2006124459 A2 * | 11/2006 | | B26F 3/002 |
| WO | WO-2019244654 A1 * | 12/2009 | | |
| WO | WO-2015029888 A1 * | 3/2015 | | B65H 23/022 |
| WO | 2016/187172 | 11/2016 | | |
| WO | WO-2018070258 A1 * | 4/2018 | | B28D 1/226 |
| WO | 2018/079343 | 5/2018 | | |
| WO | WO-2018168382 A1 * | 9/2018 | | B65H 18/08 |
| WO | WO-2019026556 A1 * | 2/2019 | | C03B 17/06 |
| WO | WO-2019102783 A1 * | 5/2019 | | B65H 35/02 |
| WO | WO-2019151246 A1 * | 8/2019 | | B65G 49/06 |

OTHER PUBLICATIONS

International Preliminary Report on Patentability and Written Opinion of the International Searching Authority issued Jul. 26, 2022 in International (PCT) Application No. PCT/JP2021/000513.

Office Action issued Jan. 17, 2024 in corresponding Chinese Patent Application No. 202180006318.9, with English translation.

* cited by examiner

METHOD FOR PRODUCING GLASS FILM

TECHNICAL FIELD

The present invention relates to a method of manufacturing a glass film.

BACKGROUND ART

In recent years, a small thickness and a small weight are demanded for mobile terminals such as smartphones and tablet PCs which are rapidly spread. Thus, in the current condition, there is an increasing demand for reduction in thickness of glass substrates to be incorporated into those terminals. Under such current condition, a glass film which is a glass substrate reduced in thickness as small as that of a film (for example, thickness equal to or smaller than 300 µm) is now developed and manufactured.

For example, in Patent Literature 1, there is disclosed a method of manufacturing a glass film by an overflow down-draw method. The manufacturing method includes a forming step of forming a band-shaped base glass film (glass ribbon) by a forming portion, a conveying step of dividing the base glass film into a product portion (hereinafter referred to as "product glass film") and non-product portions while conveying the base glass film along a conveying direction by a lateral conveying unit, and a roll-up step of rolling up the product glass film into a roll shape by a roll-up portion.

In the lateral conveying unit, a cutting device configured to divide the base glass film into the product glass film and the non-product portions is provided. The band-shaped non-product portions formed by cutting the base glass film by the cutting device are unnecessary portions including end portions (selvage portions) of the base glass film in a width direction. The non-product portions are discarded in the middle of conveyance by the lateral conveying unit.

CITATION LIST

Patent Literature 1: JP 2015-174744 A1

SUMMARY OF INVENTION

Technical Problem

Figure 9:
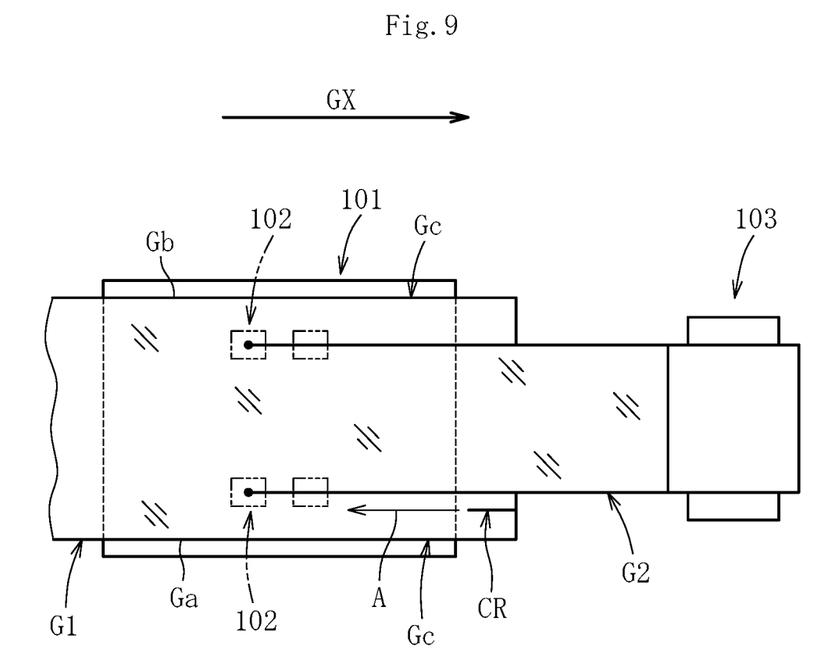
FIG. 9 is a plan view for illustrating a related-art method of manufacturing a glass film.

In the case of manufacturing a glass film as described above, a crack may be formed in each of the non-product portions being conveyed. In the following, a mode of formation of the crack is described with reference to FIG. 9. FIG. 9 is a plan view for illustrating a state in which the base glass film is divided into the product glass film and the non-product portions.

A base glass film G1 includes end portions Ga and Gb in the width direction. The base glass film G1 is conveyed along a lateral conveying direction GX by a conveying device 101. The base glass film G1 is divided into a product glass film G2 and non-product portions Gc by a cutting device 102 in the middle of conveyance. The product glass film G2 is rolled up into a roll shape by a roll-up device 103 arranged on a downstream side of the conveying device 101. The non-product portions Gc deviate from a conveyance path for the product glass film G2 in the middle of conveyance, and are discarded accompanied by, for example, a step of fracturing.

A crack CR may be formed at an end portion (distal end portion) of the non-product portion Gc on the most downstream side. When the crack CR is left as it is, the crack CR may linearly propagate to the upstream side (direction opposite to the lateral conveying direction GX) as indicated by the arrow A in FIG. 9.

When the crack CR formed in the non-product portion Gc further propagates to the upstream side, the crack CR may reach a cutting site for the base glass film G1. When the crack CR is further left as it is, the crack CR may reach the forming step.

Thus, in the related-art method of manufacturing a glass film, the crack formed in each of the non-product portion may inhibit cutting of the base glass film or hinder manufacture of the base glass film in the forming step.

The present invention has been made in view of the above-mentioned circumstances, and has a technical object to suppress propagation of a crack formed in a non-product portion formed by cutting an end portion of a glass film in a width direction.

Solution to Problem

In order to achieve the above-mentioned object, according to the present invention, there is provided a method of manufacturing a glass film, comprising: a forming step of forming a band-shaped glass film by a forming device; and a conveying step of conveying the glass film along a lateral conveying direction by a conveying device, wherein the conveying step comprises: a cutting step of removing an end portion of the glass film in a width direction as a non-product portion; and a discarding step of discarding the non-product portion, and wherein, in the discarding step, a crack formed in the non-product portion along a longitudinal direction of the glass film is guided by a guiding member so as to propagate to an outer end portion of the non-product portion in the width direction.

According to such a configuration, the crack formed in the non-product portion in the discarding step can be caused to propagate to the outer end portion of the non-product portion by the guiding member. With this, propagation of the crack toward the forming step can be suppressed.

The guiding member may comprise a roller. With rotation of the guiding member when coming into contact with the non-product portion, the non-product portion can be suitably conveyed while propagation of the crack to the upstream side is suppressed.

The guiding member may come into contact with the non-product portion when the crack is formed in the non-product portion. With this, under a state in which the crack is not formed in the non-product portion, the non-product portion can be suitably conveyed and discarded without applying resistance to the non-product portion.

The guiding member can move from a standby position away from the non-product portion to the non-product portion when the crack is formed in the non-product portion. With this, when the crack is formed in the non-product portion, the guiding member can be reliably brought into contact with the non-product portion.

The method of manufacturing a glass film according to the present invention may further comprise a direction converting step of converting a conveying direction of the glass film formed by the forming step from a vertical direction to the lateral conveying direction.

In the method of manufacturing a glass film according to the present invention, the forming device comprises an elongated forming body configured to execute an overflow down-draw method. The forming body comprises: an overflow groove formed in an elongated shape along a longitudinal direction of the forming body; and a supply portion configured to supply a molten glass from one end portion side of the forming body in the longitudinal direction to the overflow groove. The overflow groove comprises a first end portion and a second end portion in a longitudinal direction of the overflow groove. The one end portion is located on the supply portion side. The glass film comprises: one end portion in the width direction formed by the molten glass overflowing from the first end portion of the overflow groove; and another end portion in the width direction formed by the molten glass overflowing from the second end portion of the overflow groove. The non-product portion comprises: a first non-product portion including the one end portion of the glass film in the width direction; and a second non-product portion including the another end portion of the glass film in the width direction. The guiding member comprises: a first guiding member configured to guide the crack formed in the first non-product portion; and a second guiding member configured to guide the crack formed in the second non-product portion. The number of the first guiding member may be larger than the number of the second guiding member. The number of the first guiding members to be installed is set larger in a portion of the first non-product portion in which the crack is liable to be formed. With this, the crack formed in the first non-product portion can be caused to propagate to the outer end portion more reliably.

Advantageous Effects of Invention

According to the present invention, it is possible to suppress propagation of the crack formed in the non-product portion formed by cutting the end portion of the glass film in the width direction.

DESCRIPTION OF EMBODIMENTS

Now, embodiments of the present invention is described with reference to the drawings. In each of FIG. 1 to FIG. 7, a method of manufacturing a glass film according to a first embodiment of the present invention is illustrated.

Figure 1:
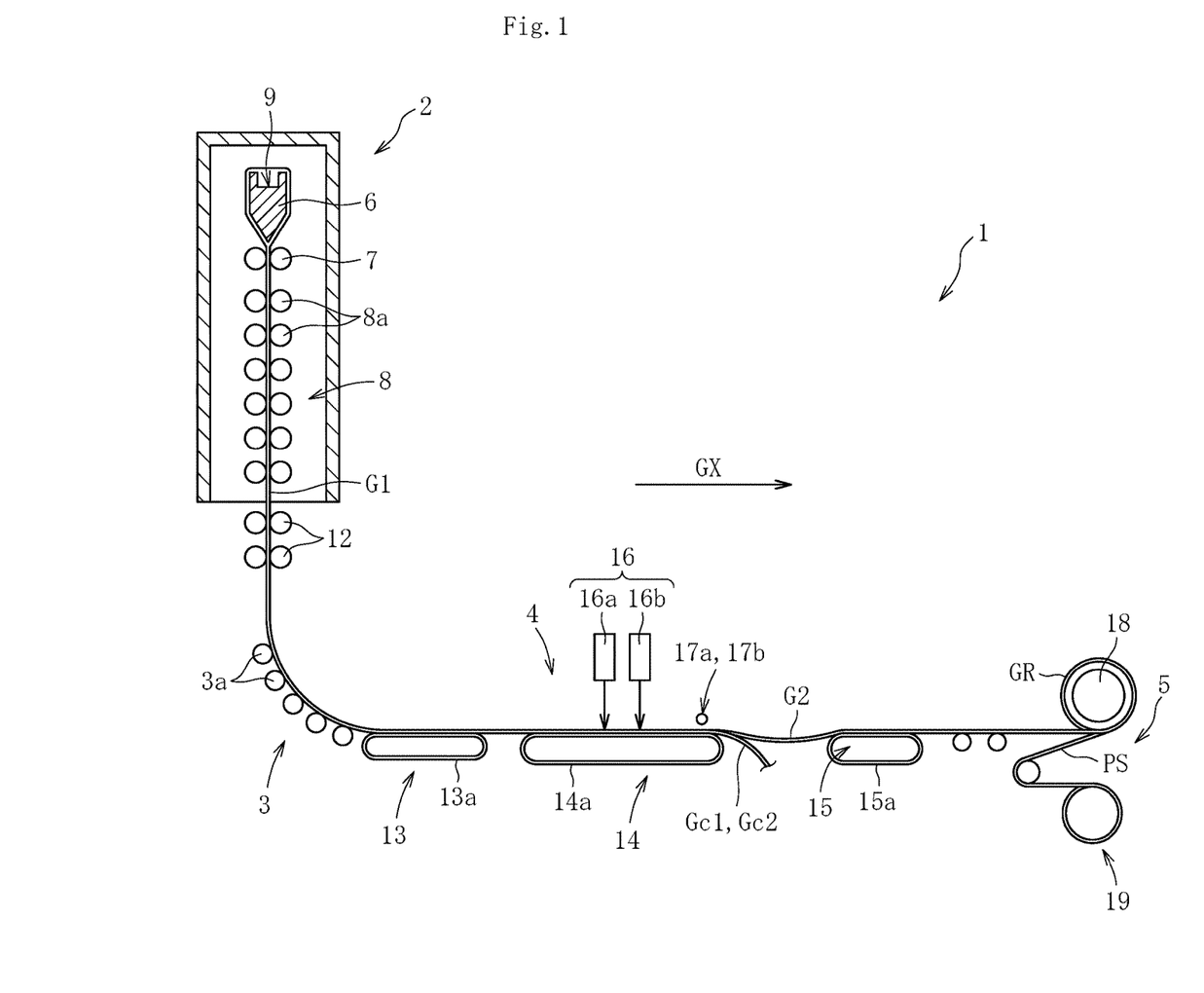
FIG. 1 is a side view for illustrating a method of manufacturing a glass film according to a first embodiment of the present invention.
Figure 2:
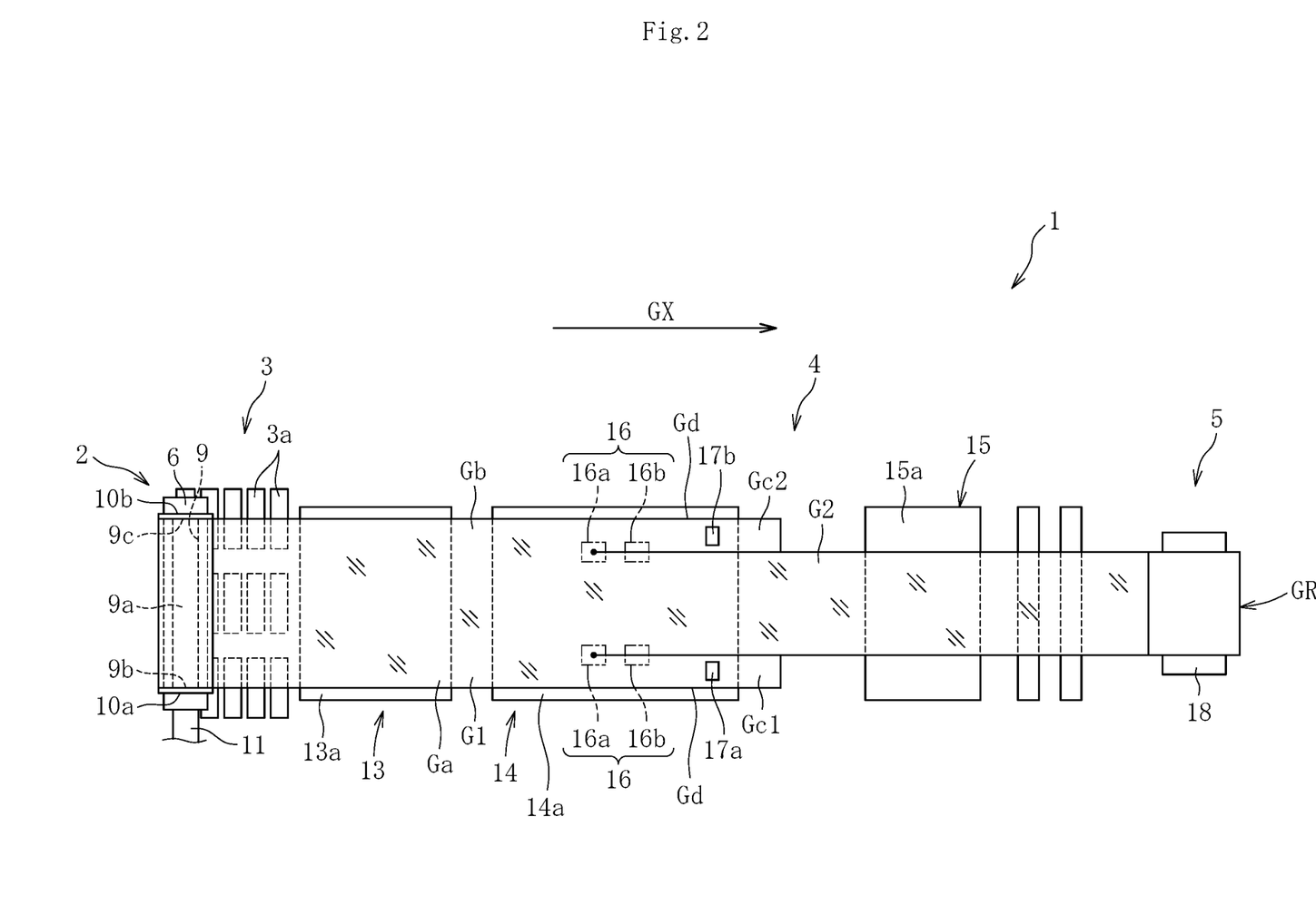
FIG. 2 is a plan view for illustrating the method of manufacturing a glass film.

In each of FIG. 1 and FIG. 2, there is illustrated an overall configuration of a manufacturing apparatus for a glass film (glass roll) to be used in this method. A manufacturing apparatus 1 comprises: a forming device 2 configured to form a band-shaped base glass film (glass ribbon) G1 from a molten glass; a direction conversion device 3 configured to convert a traveling direction of the base glass film G1; a lateral conveying device 4 configured to convey the base glass film G1 along a lateral conveying direction GX; and a roll-up device 5 configured to roll-up a product glass film G2 obtained by removing unnecessary portions (selvage portions) of end portions Ga and Gb in a width direction of the base glass film G1 into a roll shape to form a glass roll GR.

In this embodiment, the thickness of the product glass film G2 is set to 300 µm or less, preferably 100 µm or less.

Figure 3:
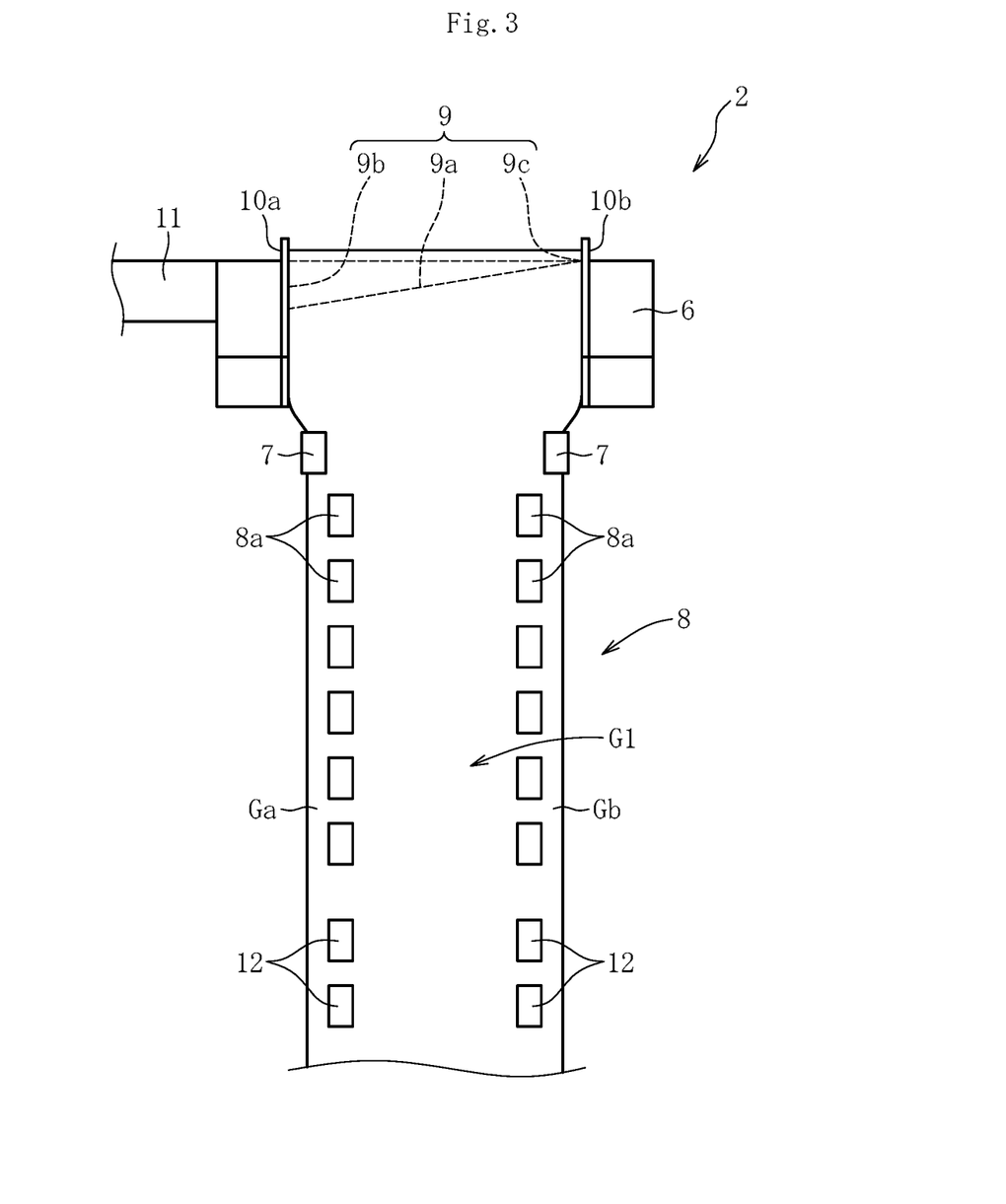
FIG. 3 is a front view for illustrating a forming step in the method of manufacturing a glass film.

As illustrated in FIG. 1 to FIG. 3, the forming device 2 comprises: an elongated forming body 6 which has a substantially wedge shape in sectional view, and is configured to execute the overflow down-draw method; edge rollers 7 which are arranged immediately below the forming body 6, and are configured to sandwich a molten glass overflowing from the forming body 6 from both front and back surface sides of the molten glass; and an annealer 8 arranged immediately below the edge rollers 7.

The forming body 6 comprises: an overflow groove 9 formed in an upper portion of the forming body 6; guide portions 10a and 10b configured to control a flow of the molten glass; and a supply portion 11 configured to supply the molten glass from one end portion side of the forming body 6 in a longitudinal direction thereof to the overflow groove 9.

The overflow groove 9 is formed in an elongated shape along the longitudinal direction of the forming body 6. The overflow groove 9 comprises: a bottom surface 9a; and a first end portion 9b and a second end portion 9c in the longitudinal direction. The bottom surface 9a is formed as an inclined surface which is gradually reduced in depth from the first end portion 9b toward the second end portion 9c. The first end portion 9b is an end portion located on the supply portion 11 side. The second end portion 9c is located at a position further away from the supply portion 11 than the first end portion 9b.

The guide portions 10a and 10b comprise: a first guide portion 10a corresponding to the first end portion 9b of the overflow groove 9; and a second guide portion 10b corresponding to the second end portion 9c of the overflow groove 9. The first guide portion 10a controls the flow of the molten glass overflowing from the first end portion 9b of the overflow groove 9. The second guide portion 10b controls the flow of the molten glass overflowing from the second end portion 9c of the overflow groove 9.

The supply portion 11 is coupled to the first end portion 9b of the overflow groove 9. The supply portion 11 is formed in a tubular shape by, for example, platinum or a platinum alloy.

The forming device 2 causes the molten glass overflowing from the upper part of the overflow groove 9 of the forming body 6 to flow down along both side surfaces of the forming body 6 while controlling the flow by the guide portions 10a and 10b to be joined at a lower end of the forming body 6, to thereby form the molten glass into a film shape. The edge rollers 7 are configured to control shrinkage of the molten glass in a width direction to form the base glass film G1 having a predetermined width. The annealer 8 is configured to perform strain removal treatment on the base glass film G1. The annealer 8 comprises annealer rollers 8a arranged in a plurality of stages in a vertical direction.

Support rollers 12 configured to sandwich the base glass film G1 from both the front and back surface sides are arranged below the annealer 8. A tension for encouraging thinning of the base glass film G1 is applied between the support rollers 12 and the edge rollers 7 or between the support rollers 12 and the annealer rollers 8a at any one position.

The direction conversion device 3 is configured to convert the traveling direction of the base glass film G1 from the vertical direction to the lateral conveying direction GX. The direction conversion device 3 is arranged at a position below the support rollers 12. The direction conversion device 3 comprises a plurality of guide rollers 3a configured to guide the base glass film G1. The plurality of guide rollers 3a are arranged in a curved form in order to change the conveying direction of the base glass film G1.

As illustrated in FIG. 3, the base glass film G1 comprises: one end portion Ga in the width direction formed by the molten glass overflowing from the first end portion 9b of the overflow groove 9 of the forming body 6; and another end portion Gb in the width direction formed by the molten glass overflowing from the second end portion 9c of the overflow groove 9.

The lateral conveying device 4 is arranged on a downstream side of the direction conversion device 3 in the traveling direction of the base glass film G1. The lateral conveying device 4 comprises: a first conveying device 13; a second conveying device 14; and a third conveying device 15. The first conveying device 13 is arranged on a downstream side of the direction conversion device 3. The second conveying device 14 is arranged on a downstream side of the first conveying device 13. The third conveying device 15 is arranged on a downstream side of the second conveying device 14.

The first conveying device 13 and the second conveying device 14 are each formed of, for example, a belt conveyor, but may be each formed of a roller conveyor or other various conveyors instead of the belt conveyor. The first conveying device 13 comprises a conveyor belt 13a. The conveyor belt 13a is configured to continuously convey the base glass film G1 having passed through the direction conversion device 3 to the second conveying device 14 on a downstream side along the lateral conveying direction GX.

The second conveying device 14 comprises: a conveyor belt 14a; a cutting device 16 configured to cut the end portions (selvage portions) Ga and Gb of the base glass film G1 in the width direction as non-product portions Gc1 and Gc2; and guiding members 17a and 17b each configured to control a direction of propagation of a crack CR formed in a corresponding one of the non-product portions Gc1 and Gc2.

The conveyor belt 14a is configured to convey the base glass film G1 to a halfway portion of the conveyor belt 14a, and to convey the product glass film G2 and the non-product portions Gc1 and Gc2, which are formed by cutting the base glass film G1, to the downstream side at the halfway portion.

The cutting device 16 is configured to cut the base glass film G1 by, for example, laser cleavage. However, the present invention is not limited to this cutting mode. The cutting device 16 comprises: a pair of laser irradiation devices 16a; and a pair of cooling devices 16b arranged on a downstream side of the laser irradiation devices 16a. The cutting device 16 is configured to, while the base glass film G1 is conveyed, heat a predetermined site of the base glass film G1 through irradiation with a laser beam from the laser irradiation device 16a, and then release a cooling medium from the cooling device 16b to cool the heated site.

The guiding members 17a and 17b comprise: a first guiding member 17a corresponding to the first non-product portion Gc1 including the one end portion Ga of the base glass film G1 in the width direction; and a second guiding member 17b corresponding to the second non-product portion Gc2 including the another end portion Gb of the base glass film G1 in the width direction.

The guiding members 17a and 17b are formed of rollers, but are not limited to this configuration. Each of the guiding members 17a and 17b is arranged on a downstream side of the cutting device 16. Further, each of the guiding members 17a and 17b is arranged above the conveyor belt 14a so as to come into contact with a corresponding one of the non-product portions Gc1 and Gc2 when the crack CR is formed in the corresponding one of the non-product portions Gc1 and Gc2. Each of the guiding members 17a and 17b is configured so as to be movable in the vertical direction and the horizontal direction by a moving mechanism.

The third conveying device 15 is configured to convey the product glass film G2 to the downstream side under a state in which the product glass film G2 is fixed and held. The third conveying device 15 is formed of, for example, a suction conveyor including a conveyor belt 15a.

In this embodiment, the expression "fixed and held" means that the conveyor belt 15a and a site of the product glass film G2 that is being conveyed are not relatively displaced from each other during conveyance of the product glass film G2 by the third conveying device 15. That is, under a state in which the product glass film G2 is fixed and held, the surface of the conveyor belt 15a and a part of a lower surface of the product glass film G2 that is brought into contact with the surface are not relatively displaced from each other during conveyance.

The conveyor belt 15a has a large number of suction holes (not shown) that penetrate through the conveyor belt 15a in a thickness direction. In addition, a negative pressure generating device (not shown) connected to a vacuum pump or the like is arranged on an inner peripheral side of the conveyor belt 15a. The negative pressure generating device is configured to generate a negative pressure for sucking the product glass film G2 through the suction holes.

As a result, the surface of the conveyor belt 15a fixes and holds the lower surface of the product glass film G2 by suction. The product glass film G2 in a state of being sucked by the conveyor belt 15a is conveyed to a downstream side of a conveyance path at a conveyance speed that is the same as the feed speed of the conveyor belt 15a.

Due to fixing and holding by the third conveying device 15, the product glass film G2 is conveyed in a loosened state in a region between the second conveying device 14 and the third conveying device 15, and is conveyed under a state in which a tension is applied in the longitudinal direction in a region between the third conveying device 15 and the roll-up device 5.

The roll-up device 5 is installed on a downstream side of the third conveying device 15. The roll-up device 5 comprises: a roll-up roller 18; a motor (not shown) configured to drive the roll-up roller 18 to rotate; and a protective sheet supply portion 19 configured to supply a protective sheet PS to the roll-up roller 18. The roll-up device 5 is configured to roll-up the product glass film G2 into a roll shape by rotating the roll-up roller 18 with the motor while superposing the protective sheet PS on the product glass film G2 from the protective sheet supply portion 19. The rolled-up product glass film G2 is formed as the glass roll GR.

Now, a method of manufacturing the glass films G1 and G2 (the glass roll GR) through use of the manufacturing apparatus 1 having the above-mentioned configuration is described. This method comprises: a forming step of forming the base glass film G1; a conveying step of conveying each of the glass films G1 and G2; and a roll-up step of rolling up the product glass film G2 into a roll shape.

In the forming step, the molten glass overflowing from the upper part of the overflow groove 9 of the forming body 6 in the forming device 2 is caused to flow down along both side surfaces of the forming body 6 to be joined at a lower end of the forming body 6, to thereby form the molten glass into a film shape. At this time, the shrinkage of the molten glass in a width direction is controlled with the edge rollers 7, and thus the base glass film G1 having a predetermined width is formed. After that, strain removal treatment is performed on the base glass film G1 with the annealer 8. The base glass film G1 having a predetermined thickness is formed through an action of a tension applied by the support rollers 12.

In the conveying step, the conveying direction of the base glass film G1 formed in the forming step is converted from the vertical direction to the lateral conveying direction GX by the direction conversion device 3 (direction converting step). Further, in the conveying step, the base glass film G1 is conveyed by the first conveying device 13 and the second conveying device 14, and the product glass film G2 is conveyed by the second conveying device 14 and the third conveying device 15.

The conveying step comprises: a cutting step of dividing the base glass film G1 into the product glass film G2 and the non-product portions Gc1 and Gc2; and a discarding step of discarding the non-product portions Gc1 and Gc2.

Figure 4:
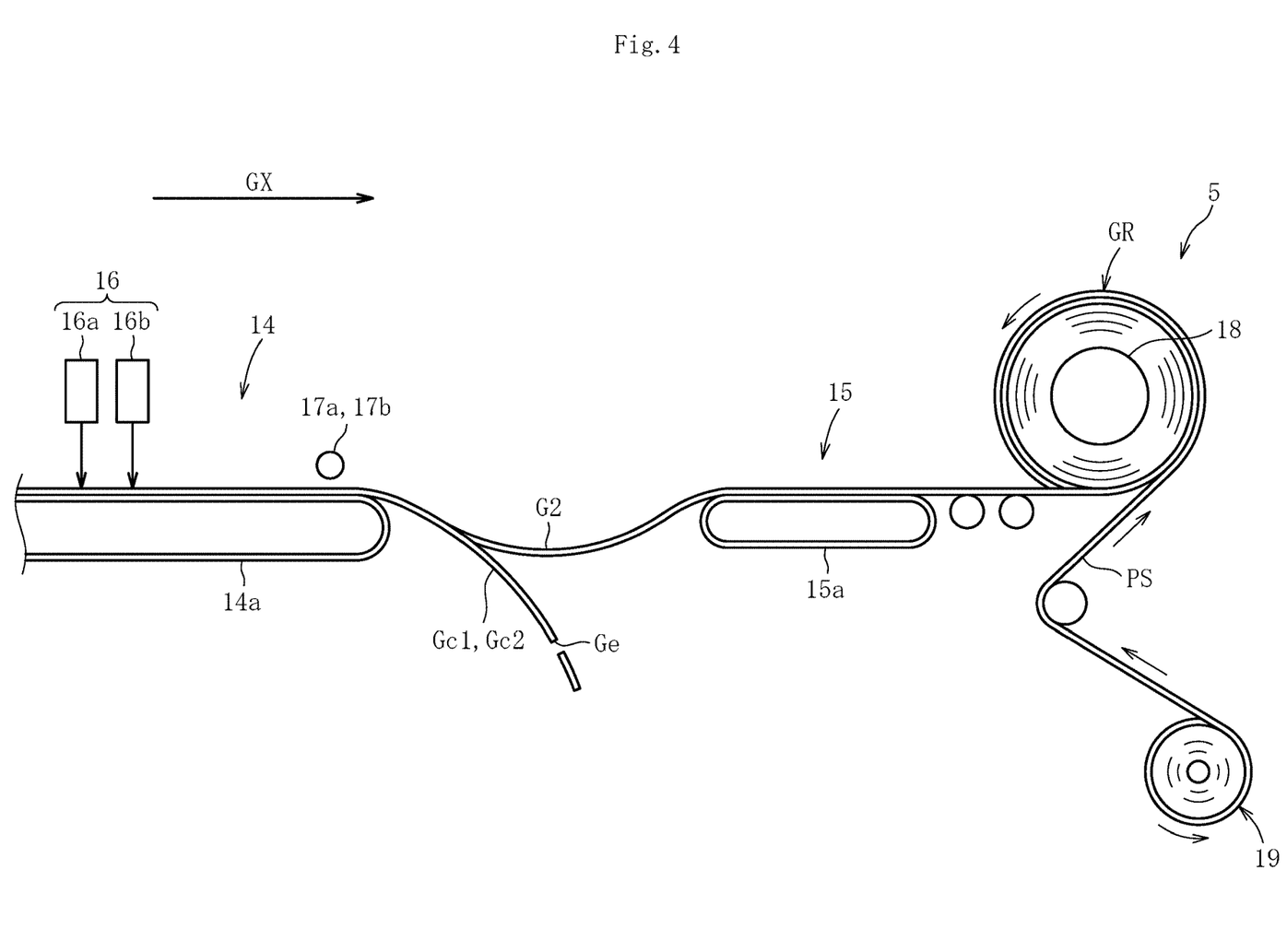
FIG. 4 is a side view for illustrating a conveying step in the method of manufacturing a glass film.

As illustrated in FIG. 4, in the cutting step, while the base glass film G1 is sent to a downstream side by the conveyor belt 14a of the second conveying device 14, part of the base glass film G1 is heated through irradiation with the laser beam by the laser irradiation device 16a in the cutting device 16. After that, the cooling medium is jetted to the heated site by the cooling device 16b. With this, a thermal stress is generated in the base glass film G1. The cutting device 16 causes initial cracks formed in the base glass film G1 in advance to propagate through the thermal stress. With this, the product glass film G2 and the non-product portions Gc1 and Gc2 are formed from the base glass film G1.

The one end portion Ga of the base glass film G1 remains in the first non-product portion Gc1 as an outer end portion Gd of the first non-product portion Gc1 in the width direction after cutting. Further, the another end portion Gb of the base glass film G1 remains in the second non-product portion Gc2 as an outer end portion Gd of the second non-product portion Gc2 in the width direction after cutting.

In the discarding step, the non-product portions Gc1 and Gc2 are conveyed to the downstream side by the second conveying device 14. After that, the non-product portions Gc1 and Gc2 deviate downward from the conveyance path for the product glass film G2, and are cut to a length suitable for disposal. The cutting for disposal is executed by curving the upper surface sides of the non-product portions Gc1 and Gc2 in a protruding manner and applying bending stress. In this embodiment, in order to facilitate the cutting of the non-product portions Gc1 and Gc2, the outer end portion Gd of each of the non-product portions Gc1 and Gc2 is scratched from the upper surface side by a scratching member (not shown) for each length suitable for disposal. With this, the non-product portions Gc1 and Gc2 are easily cut (broken) with this scratch as a starting point. As the scratching member, for example, a diamond grinding wheel, a diamond chip, or sandpaper can be used.

In the non-product portions Gc1 and Gc2, at the time of the cutting described above, the crack CR may be formed in a distal end portion Ge (end portion formed due to cutting) of each of the non-product portions Gc1 and Gc2. In the discarding step, the direction of propagation of the crack CR is controlled by the guiding members 17a and 17b so as to prevent the crack CR from propagating to the upstream side to reach a cutting position for the base glass film G1 by the cutting device 16 (guiding step).

Specifically, the guiding members 17a and 17b are configured to guide the crack CR such that the crack CR formed in each of the non-product portions Gc1 and Gc2 propagates to the outer end portion Gd of a corresponding one of the non-product portions Gc1 and Gc2 in the width direction.

In the following, a case in which the crack CR is formed in the first non-product portion Gc1, and the crack CR is guided by the first guiding member 17a is described as an example.

Figure 5:
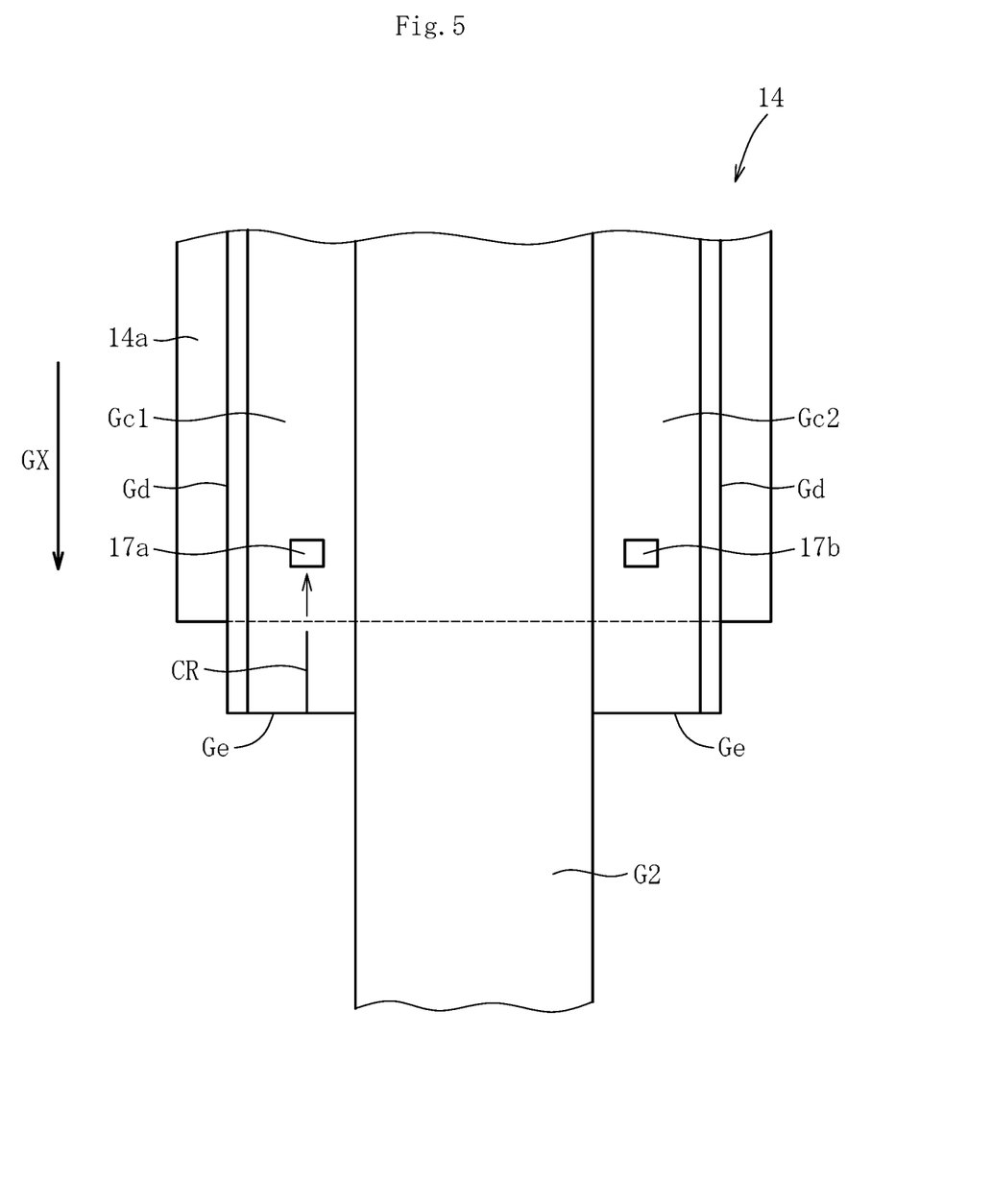
FIG. 5 is a plan view for illustrating a discarding step in the method of manufacturing a glass film.

As illustrated in FIG. 5, the crack CR formed in the distal end portion Ge of the first non-product portion Gc1 is to propagate linearly toward the upstream side along the longitudinal direction of the first non-product portion Gc1.

The inventors of the present invention has confirmed a phenomenon that, in a process in which the crack CR propagates in a direction opposite to the lateral conveying direction GX, a part of each of the non-product portions Gc1 and Gc2 rises from the conveyor belt 15a. That is, as illustrated in FIG. 6, when the crack CR is formed in the first non-product portion Gc1, along with propagation of the crack CR to the upstream side, a part of the first non-product portion Gc1 is raised (separated away from the conveyor belt 14a) to come into contact with the first guiding member 17a.

Thus, under a state in which the crack CR is not formed, the first guiding member 17a does not come into contact with the first non-product portion Gc1 and can allow passage of the first non-product portion Gc1, and the first guiding member 17a can come into contact with the first non-product portion Gc1 only when the crack CR is formed.

Figure 6:
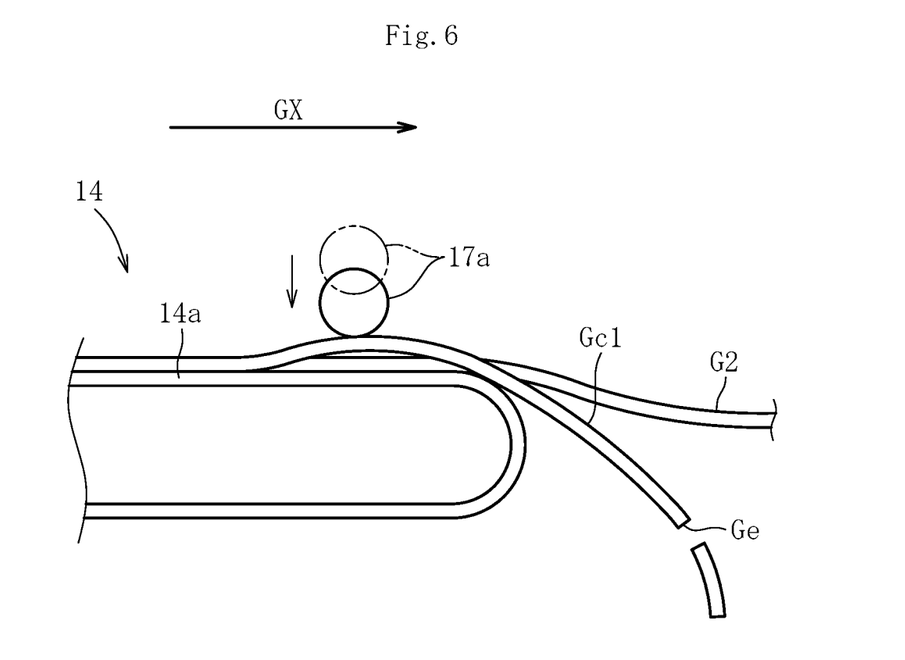
FIG. 6 is a side view for illustrating the discarding step in the method of manufacturing a glass film.

As illustrated in FIG. 6, the first guiding member 17a can move downward from a standby position (position indicated by the two-dot chain line) away from the first non-product portion Gc1 toward a position (guide position) that allows contact with the first non-product portion Gc1 in which the crack CR propagates. The movement of the first guiding member 17a can be achieved in such a manner that, when the crack CR is formed in the first non-product portion Gc1, rising of a part of the first non-product portion Gc1 is detected by a sensor, and the moving mechanism is operated in accordance with the detection. Alternatively, when the crack CR is formed in the first non-product portion Gc1, an observer may operate the moving mechanism to move the first guiding member 17a from the standby position toward the first non-product portion Gc1.

The present invention is not limited to the moving mode of the first guiding member 17a described above, and the first guiding member 17a may be positioned at a position (position of the first guiding member 17a, which is indicated by the solid line in FIG. 6) that allows contact when a part of the first non-product portion Gc1 rises. With this, the first guiding member 17a can be brought into contact with the first non-product portion Gc1 in which the crack CR propagates without moving the first guiding member 17a.

When a part of the first non-product portion Gc1 comes into contact with the first guiding member 17a, a pressing force by the first guiding member 17a acts on a part of the first non-product portion Gc1. With this, the traveling direction of the crack CR in the first non-product portion Gc1 is changed.

Figure 7:
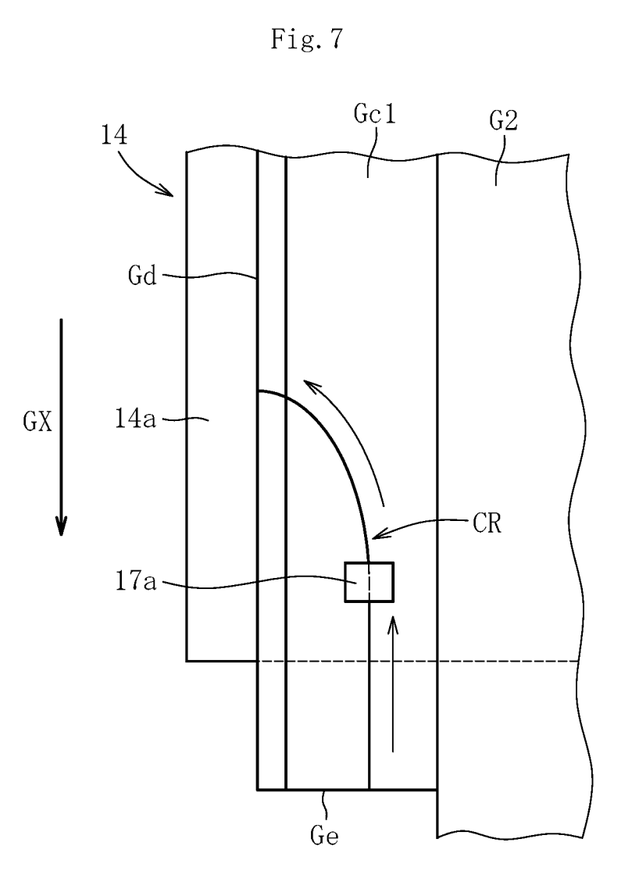
FIG. 7 is a plan view for illustrating the discarding step in the method of manufacturing a glass film.

As illustrated in FIG. 7, the crack CR linearly travels along the longitudinal direction of the first non-product portion Gc1 until reaching the first guiding member 17a, and changes the traveling direction after passing through the first guiding member 17a. That is, the crack CR passes through the first guiding member 17a to the upstream side so as to overlap the first guiding member 17a, and then travels toward the outer end portion Gd of the first non-product portion Gc1. When the crack CR reaches the outer end portion Gd, a part of the first non-product portion Gc1 is divided so that propagation of the crack CR is ended. After that, the first non-product portion Gc1 in which the crack CR is not present passes from the upstream side to the downstream side of the first guiding member 17a. It is preferred that each of the guiding members 17a and 17b be arranged at a position away from each outer end portion Gd in the width direction so as not to overlap the outer end portion Gd of each of the non-product portions Gc1 and Gc2 in plan view (see FIG. 7).

In the roll-up step, the product glass film G2 conveyed by the third conveying device 15 is rolled up into a roll shape by the roll-up roller 18 of the roll-up device 5 while the protective sheet PS is supplied from the protective sheet supply portion 19 to the product glass film G2. When the product glass film G2 having a predetermined length is rolled up by the roll-up roller 18, the glass roll GR is completed.

According to the method of manufacturing the glass films G1 and G2 according to this embodiment described above, in the discarding step, when the crack CR is formed in each of the non-product portions Gc1 and Gc2, the crack CR can be caused to propagate to the outer end portion Gd of each of the non-product portions Gc1 and Gc2 by the guiding members 17a and 17b. With this, propagation of the crack CR is suppressed in a limited manner, and the crack CR can be prevented from propagating to the cutting step and the forming step on the upstream side of the discarding step.

Figure 8:
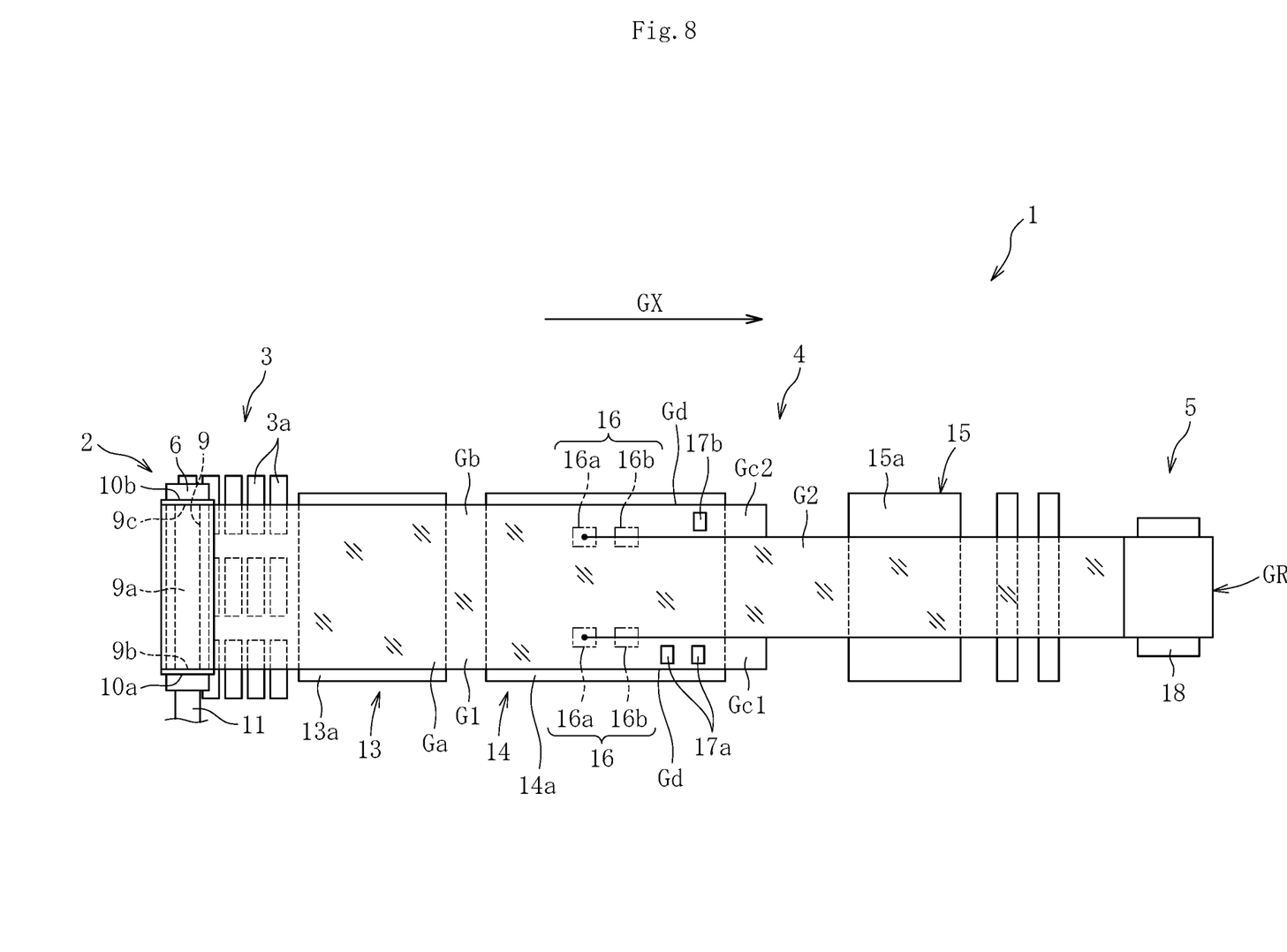
FIG. 8 is a plan view for illustrating a method of manufacturing a glass film according to a second embodiment.

FIG. 8 is an illustration of a method of manufacturing a glass film according to a second embodiment of the present invention. In this embodiment, configurations of the guiding members 17a and 17b in the second conveying device 14 are different from those of the first embodiment.

In the manufacturing apparatus 1 according to this embodiment, the number of the first guiding members 17a is larger than the number of the second guiding member 17b. That is, the second guiding member 17b is formed of one roller, whereas the first guiding members 17a comprise two rollers separated from each other in the lateral conveying direction GX. It is empirically known that the crack CR is liable to be formed in the first non-product portion Gc1 corresponding to the supply portion 11 side. Even when the crack CR is not completely guided to the outer end portion Gd after the formed crack CR passes through the first guiding member 17a (on the downstream side in the lateral conveying direction GX), the crack CR can be guided to the outer end portion Gd by passing through the second first guiding member 17a (on the upstream side in the lateral conveying direction GX).

The present invention is not limited to the configurations of the above-mentioned embodiments. In addition, the action and effect of the present invention are not limited to those described above. The present invention may be modified in various forms within the range not departing from the spirit of the present invention.

In the embodiments described above, an example in which the guiding members 17a and 17b are formed of rollers is described, but the present invention is not limited to this configuration. The guiding members 17a and 17b may be formed of, for example, a member capable of coming into contact with the non-product portions Gc1 and Gc2, such as a bar member, a plate member, or a piston.

In the embodiments described above, one or two first guiding members 17a and one second guiding member 17b are described as an example, but the number of each of the guiding members 17a and 17b is not limited to those of the embodiments described above.

REFERENCE SIGNS LIST 2 forming device
4 lateral conveying device
6 forming body
9 overflow groove
9b first end portion of overflow groove
9c second end portion of overflow groove
11 supply portion
17a first guiding member
17b second guiding member
CR crack
G1 base glass film
Ga one end portion of base glass film in width direction
Gb another end portion of base glass film in width direction
G2 product glass film
Gc1 first non-product portion
Gc2 second non-product portion
Gd outer end portion of non-product portion
GX lateral conveying direction

The invention claimed is:

1. A method of manufacturing a glass film, the method comprising:
   a forming step of forming a band-shaped glass film by a forming device; and
   a conveying step of conveying the glass film along a lateral conveying direction by a conveying device,
   wherein the conveying step comprises:
      a cutting step of removing an end portion of the glass film in a width direction as a non-product portion; and
      a discarding step of discarding the non-product portion,
   wherein, in the discarding step, a scratch is formed on a part of the non-product portion, and the non-product portion is broken with the scratch as a starting point,
   wherein, in the discarding step, a crack formed along a longitudinal direction of the glass film from a distal end portion of the non-product portion formed by breaking the non-product portion is guided by a guiding member to propagate to an outer end portion of the non-product portion in the width direction,
   wherein the guiding member is positioned separated upward from the non-product portion, and
   wherein the guiding member comes into contact with a part of the non-product portion that separates upward from the conveying device when the crack is formed at the distal end portion of the non-product portion so as to direct the crack that propagates from a downstream side toward an upstream side in the lateral conveying direction along the longitudinal direction of the glass film toward the outer end portion of the glass film in the width direction.

2. The method of manufacturing a glass film according to claim 1, wherein the guiding member comprises a roller.

3. The method of manufacturing a glass film according to claim 1, wherein the guiding member is configured to move from a standby position away from the non-product portion to contact the part of the non-product portion when the crack is formed at the distal end portion of the non-product portion.

4. The method of manufacturing a glass film according to claim 1, further comprising a direction converting step of converting a conveying direction of the glass film formed by the forming step from a vertical direction to the lateral conveying direction.

5. The method of manufacturing a glass film according to claim 1,
wherein the forming device comprises an elongated forming body configured to execute an overflow down-draw method,
wherein the forming body comprises:
an overflow groove formed in an elongated shape along a longitudinal direction of the forming body; and
a supply portion configured to supply a molten glass from one end portion side of the forming body in the longitudinal direction of the forming body to the overflow groove,
wherein the overflow groove comprises a first end portion and a second end portion in a longitudinal direction of the overflow groove,
wherein the first end portion is located on a supply portion side,
wherein the glass film comprises:
one end portion in the width direction formed by the molten glass overflowing from the first end portion of the overflow groove; and
another end portion in the width direction formed by the molten glass overflowing from the second end portion of the overflow groove,
wherein the non-product portion comprises:
a first non-product portion including the one end portion of the glass film in the width direction; and
a second non-product portion including the another end portion of the glass film in the width direction,
wherein the guiding member comprises:
at least two first guiding members configured to guide the crack formed in the first non-product portion; and
a second guiding member configured to guide the crack formed in the second non-product portion, and
wherein a number of the first guiding members is larger than a number of the second guiding member.

* * * * *